(12) United States Patent  
Yanagisawa et al.

(10) Patent No.: US 7,952,791 B2  
(45) Date of Patent: May 31, 2011

(54) ELECTROPHORETIC PARTICLE, ELECTROPHORETIC PARTICLE DISPERSION LIQUID, IMAGE DISPLAY MEDIUM, AND IMAGE DISPLAY DEVICE

(75) Inventors: Masahiro Yanagisawa, Kanagawa (JP); Yoshihisa Naijo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 222 days.

(21) Appl. No.: 12/304,510

(22) PCT Filed: May 9, 2008

(86) PCT No.: PCT/JP2008/058994  
§ 371 (c)(1), (2), (4) Date: Dec. 12, 2008

(87) PCT Pub. No.: WO2008/143153  
PCT Pub. Date: Nov. 27, 2008

(65) Prior Publication Data  
US 2009/0207476 A1 Aug. 20, 2009

(30) Foreign Application Priority Data  
May 18, 2007 (JP) .................. 2007-133331

(51) Int. Cl.  
G02B 26/00 (2006.01)  
G02G 3/34 (2006.01)  
(52) U.S. Cl. .................. 359/296; 345/107  
(58) Field of Classification Search .............. 359/296, 359/265, 452; 345/107, 108; 430/35, 38, 430/19; 204/477, 622; 524/268, 588  
See application file for complete search history.

(56) References Cited

U.S. PATENT DOCUMENTS

| | | | |
|---|---|---|---|
| 6,590,696 B2 * | 7/2003 | Yanagisawa et al. | 359/296 |
| 6,765,713 B2 * | 7/2004 | Yanagisawa | 359/296 |
| 6,858,164 B2 | 2/2005 | Yanagisawa | |
| 2003/0230487 A1 | 12/2003 | Yanagisawa | |
| 2006/0155137 A1 | 7/2006 | Yamamoto | |
| 2006/0245037 A1 | 11/2006 | Yamamoto et al. | |

FOREIGN PATENT DOCUMENTS

| | | |
|---|---|---|
| JP | 5-173193 | 7/1993 |
| JP | 5-173194 | 7/1993 |
| JP | 2612472 | 2/1997 |
| JP | 2004-4741 | 1/2004 |
| JP | 2004-54248 | 2/2004 |
| JP | 2004-279732 | 10/2004 |
| JP | 2005-70369 | 3/2005 |

(Continued)

OTHER PUBLICATIONS

U.S. Appl. No. 08/643,456, Filed May 8, 1996 (Abandoned).

(Continued)

*Primary Examiner* — Mohammed Hasan  
(74) *Attorney, Agent, or Firm* — Cooper & Dunham LLP

(57) ABSTRACT

Disclosed is an electrophoretic particle comprising a polymer component on a surface thereof which polymer component is a copolymer obtained from materials comprising at least a monomer component represented by a following general formula (I): wherein R represents a hydrogen atom or a methyl group, and a monomer component represented by a following general formula (II): wherein R1 represents a hydrogen atom or a methyl group, R1, represents a hydrogen atom or an alkyl group whose carbon number is 1 to 4, n represents a natural number, and x represents an integer of 1 to 3.

11 Claims, 2 Drawing Sheets

FOREIGN PATENT DOCUMENTS

| | | |
|---|---|---|
| JP | 2005-265938 | 9/2005 |
| JP | 2006-18236 | 1/2006 |
| JP | 2006-96985 | 4/2006 |
| JP | 2006-195379 | 7/2006 |
| JP | 2006-323363 | 11/2006 |
| WO | WO2006/025553 A1 | 3/2006 |

OTHER PUBLICATIONS

U.S. Appl. No. 08/754,692, Filed Nov. 21, 1996 (Abandoned).

* cited by examiner

ELECTROPHORETIC PARTICLE, ELECTROPHORETIC PARTICLE DISPERSION LIQUID, IMAGE DISPLAY MEDIUM, AND IMAGE DISPLAY DEVICE

TECHNICAL FIELD

The present invention relates to an electrophoretic particle, an electrophoretic particle dispersion liquid, an image display medium, and an image display device.

BACKGROUND ART

Conventionally, a CRT or liquid crystal display has been used for a display terminal of so-called images such as a character, a static image and a dynamic image. Although these may display and rewrite digital data instantaneously, it is difficult to always carry the device and there are many drawbacks such that, for example, eyes may be fatigued on an extended activity or display on a power-off is hardly made. Meanwhile, when a character or a static image is distributed or stored as a document, etc., it is recorded on a paper medium by a printer. The paper medium has been widely used as a so-called hard copy. The hard copy is easier to read than a display, is not easy to cause a fatigue, and may be read in a free posture. Furthermore, it may have a feature of being lightweight so that it can be carried freely. However, a hardcopy is disposed after use thereof and recycled and a problem in terms of resource saving remains in the recycle thereof since a large amount of labor and cost are required.

A need for a rewritable and paper-like display medium having both merits of the above-mentioned display and hardcopy has been high and a display medium using a polymer-dispersed liquid crystal, a bi-stable cholesteric liquid crystal, an electrochromic element, an electrophoretic element, or the like has still been proposed and has been drawing attention as a display medium that is a reflection display type one so as to provide a bright display and may be a memory. Among these, use of an electrophoretic element may be excellent in terms of a display quality and electric power consumption at an displaying operation, which is disclosed in, for example, Japanese Patent Application Publication No. 5-173194 and Japanese Patent No. 2612472. For an electrophoretic display medium, a dispersion liquid in which plural electrophoretic particles are dispersed in a colored dispersion medium which have a color different from the color of the dispersion medium is enclosed between a pair of transparent electrodes. In this case, the surfaces of the electrophoretic particles (also simply referred to as "phoresis particles" in this section) are charged in the dispersion medium and the particles may be moved by forming an electric field between the transparent electrodes. For example, when a charge opposite to the charge of the phoresis particles is provided on one of the transparent electrodes, the phoresis particles are attracted to it so as to deposit near the electrode, whereby the color of the phoresis particles is observed. On the other hand, when the same charge as the charge of the phoresis particles is provided, the phoresis particles move to the opposite side, whereby the color of the dispersion medium is observed. Thus, each kind of display may be conducted by applying a principle such that the observed color is changed by changing the charge on the electrode surface.

Charging of an electrophoretic particle greatly depends on a functional group on a particle surface. That is, since an ionic polar group of a particle surface is ionized and accordingly has a charge, a particle may be charged by positively providing an ionic polar group to the particle. For a positively charging polar group, an amino group is known and for negatively charging polar group, a carboxyl group, a sulfonyl group, a phosphonyl group, etc., are known.

It has been widely known that when an electrophretic particle has at least a polymer component, a polymer containing a monomer unit having an amino group may be used as a positively charged particle. For example, in the case of an addition polymer of a monomer having a vinyl group, the examples of a monomer having an amino group include acrylates and methacrylates such as N-methylaminoethyl (meth)acrylate, N-ethylaminoethyl (meth)acrylate, N,N-dimethylaminoethyl (meth)acrylate, N,N-diethylaminoethyl (meth)acrylate, N,N-dibutylaminoethyl acrylate, N,N-di-tert-butylaminoethyl acrylate, 2-N-piperidylethyl (meth)acrylate, N-phenylaminoethyl methacrylate, and N,N-diphenylaminoethyl methacrylate; styrene derivatives such as dimethylaminostyrene, N-methylaminoethylstyrene, dimethylaminoethoxystyrene, diphenylaminoethylstyrene, and N-phenylaminoethylstyrene; vinylpyridine-type compounds such as 2-vinylpyridine, 4-vinylpyridine, and 2-vinyl-6-methylpyridine; and the like.

In an electrophoretic particle, the more the amount of the charge is, the better the phoresis velocity or the responsiveness at a lower electric field is, which is preferable in terms of improvement of a display-switching rate or reduction of a driving voltage. For the polymer having an amino group, it is preferable that the amino group has a strong basicity. For such a monomer having a strong basicity, compounds shown in the following general formula (I) are provided.

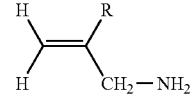

General formula (I)

[In the formula, R represents a hydrogen atom or a methyl group.]

Examples of use thereof are disclosed in, for example, Japanese Patent Application publication No. 2004-054248 and Japanese Patent Application Publication No. 2006-018236, although the purposes thereof are different.

As described above, the electrophoretic particles have been proposed, and in particular, the compounds shown in general formula (I) have a strong basicity and a sufficient charged property but the hydrophilicity thereof may be too high due to the strong basicity and it may have no affinity with a non-polar dispersion medium in an electrophoretic display medium, may be difficult to be stably dispersed in the dispersion medium and may be easy to cause aggregation or sedimentation thereof in the dispersion liquid. For a particle of electrophoretic display medium, there may be a difficult problem of the balance between a high charged property and a high dispersion stability.

BRIEF SUMMARY

In an aspect of this disclosure, there are provided an electrophoretic particle and electrophoretic particle dispersion liquid in which a responsiveness thereof in a lower electric field and a dispersion stability thereof in a dispersion medium are better, and an image display medium and image display device which use the electrophoretic particle dispersion liquid and are superior in terms of a display switching characteristic and display stability thereof at a lower voltage.

According to another aspect, there is provided an electrophoretic particle including a polymer component on a surface thereof which polymer component is a copolymer obtained from materials including at least a monomer component represented by a following general formula (I):

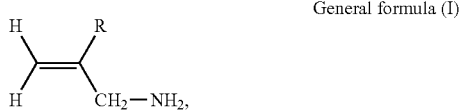
General formula (I)

wherein R represents a hydrogen atom or a methyl group, and a monomer component represented by a following general formula (II):

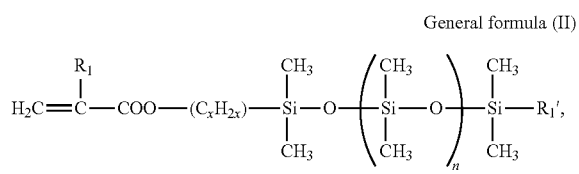
General formula (II)

wherein $R_1$ represents a hydrogen atom or a methyl group, $R_1'$ represents a hydrogen atom or an alkyl group whose carbon number is 1 to 4, n represents a natural number, and x represents an integer of 1 to 3.

According to another aspect of this disclosure, there is provided an electrophoretic particle dispersion liquid, wherein the electrophoretic particle as described above is dispersed in a non-polar solvent.

According to another aspect, there is provided an image display medium including the electrophoretic particle dispersion liquid as described above between a pair of electrically conductive layers at least one of which is optically transparent.

According to another aspect, there is provided an image display device including the image display medium as described above, an information input device configured to provide image information to the image display medium, and an electric power supplying device configured to supply an electric power to the image display medium and the information input device.

Accordingly, there may be provided an electrophoretic particle and electrophoretic particle dispersion liquid in which a responsiveness thereof in a lower electric field and a dispersion stability thereof in a dispersion medium are better, and an image display medium and image display device which use the electrophoretic particle dispersion liquid and are superior in terms of a display switching characteristic and display stability thereof at a lower voltage.

EXPLANATION OF LETTERS OR NUMERALS

Figure 1:
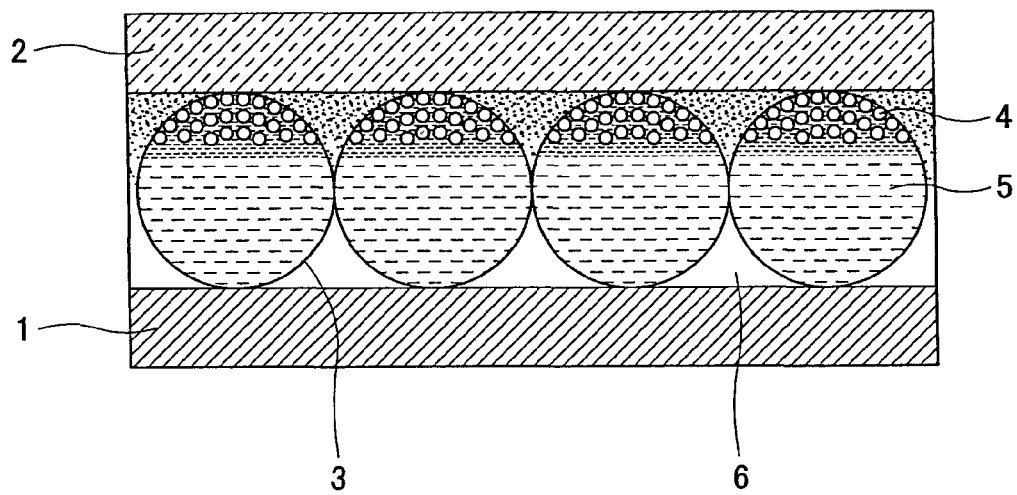
FIG. 1 is a cross-sectional schematic diagram (1) of an image display medium.

1: Electrode (electrically conductive layer)
2: Electrode (electrically conductive layer)
3: Microcapsule
4, 4A, 4B: White or colored particle
5: Colored dispersion medium
6: Adhesive support layer
7: Dispersion medium
10: Image display device
11: Image display medium
12: Housing
13: Image input device

BEST MODE FOR CARRYING OUT THE INVENTION

Next, some specific embodiments of the present invention will be described with reference to the accompanying drawings.

First Embodiment

An electrophoretic particle according to the first embodiment of the present invention is an electrophoretic particle having at least a polymer component on the surface thereof, wherein the polymer component is a copolymer obtained from materials including at least both an amino group-containing monomer represented by the following general formula (I):

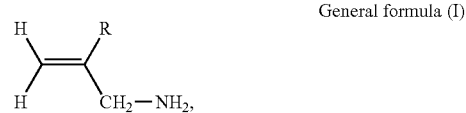
General formula (I)

[in which formula, R represents a hydrogen atom or a methyl group,] and a monomer represented by the following general formula (II):

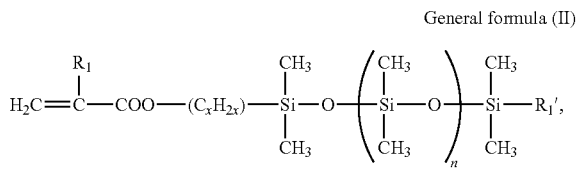
General formula (II)

[in which formula, $R_1$ represents a hydrogen atom or a methyl group, $R_1'$ represents a hydrogen atom or an alkyl group whose carbon number is 1 to 4, n represents a natural number, and x represents an integer of 1 to 3.].

The amino group-containing monomer represented by the general formula (I) is a primary amine in which the two hydrogen atoms of a terminal amino group are not replaced by alkyl groups and is strongly basic. That is, it has an ionic strength as a cation. Therefore, a polymer obtained from a material including the amino group-containing monomer is allowed to exhibit a strong and positive charged property. Also, a polysiloxane moiety of the silicone macromer represented by the general formula (II) has excellent affinity with a non-polar organic solvent, in particular, a dispersion medium that may preferably be used for an electrophoretic image display medium, such as aliphatic hydrocarbons and silicone oils. Particularly, a polymer of silicone macromer having a vinyl group at the one end thereof has a comb-type structure whose main chain is bonded to many side chains and the comb-type structural part has a solvent compatibility, whereby a polymer obtained from a material including the silicone macromer is provided with a great steric effect so as to have a good dispersion stability in the dispersion medium.

The silicone macromer represented by the general formula (II) may be a single compound and is commonly manufactured as a mixture of ones having a different molecular weight. The molecular weight of a silicone macromer for the embodiment of the present invention is not particularly limited and the average molecular weight is commonly about 500 to about 50,000, wherein, for example, a product having an x=3 in the general formula (II) and a molecular weight of 1,000, 5,000, or 10,000 is, in fact, commercially available and any one may be used well as a silicone macromer for the embodiment of the present invention.

A preferable range of the particle diameter of an electrophoretic particle for the embodiment of the present invention is 1 μm or less. If it is greater than 1 μm, the dispersion stability of the particle in a dispersion medium may be degraded so that it may be easy to sediment, whereby the display memory characteristic of a display medium may be adversely affected. Additionally, if it is greater than a light wavelength and is a visible size, no lower limit is provided.

Second Embodiment

In an electrophoretic particle according to the second embodiment of the present invention, a polymer component in the first embodiment is grafted on the surface of a white or colored particle through a chemical bond. Due to a basic group originating from an amino group of the monomer component represented by the general formula (I), on the surface of a white or colored particle, and a steric hindrance effect caused by polysiloxane of the monomer component represented by the general formula (II) (hindrance on an attracting force between particles), a particle with an excellent charged property and dispersion stability in a dispersion medium may be provided.

For a while particle, solid particles of metal oxides such as silicon dioxide, aluminum oxide, and titanium oxide may be used. For a black-colored particle, for example, carbon black, aniline black, furnace black, lamp black and the like may be used. For a cyan-colored particle, for example, phthalocyanine blue, methylene blue, Victoria blue, methyl violet, aniline blue, ultramarine blue, and the like may be used. For a magenta-colored particle, for example, rhodamine 6G lake, dimethylquinacridone, watching red, rose Bengal, rhodamine B, alizarin lake, and the like may be used. For a yellow-colored particle, for example, chrome yellow, benzidine yellow, hansa yellow, naphthol yellow, molybdenum orange, quinoline yellow, tartrazine, and the like may be used.

In order to form a polymer component for the embodiment of the present invention on a particle surface by grafting the polymer component on the surface of a white or colored particle (also referred to as, simply, a particle), it may be only necessary to provide a functional group contributing to a polymerization reaction on the surface of the white or colored particle and publicly known methods may be utilized. In the case of a particle having a surface of metal oxide such as titanium oxide, treatment with a coupling agent having a functional group contributing to a polymerization reaction is preferable. For example, in order to provide a vinyl group on the surface, a reaction with a silane coupling agent having a vinyl group, such as 3-(trimethoxysilyl)propyl methacrylate may be conducted. Also, when the particle is carbon black, for example, it is known that reaction with vinyl aniline is allowed to provide a vinyl group on a carbon black surface. An electrophoretic particle on which a polymer component for the present embodiment is grafted may be obtained by means of a graft polymerization reaction of at least monomers represented by the general formulas (I) and (II) with a particle provided with a functional group contributing to the polymerization reaction.

Third Embodiment

In an electrophoretic particle according to the third embodiment of the present invention, a polymer component for the first embodiment of the present invention contains a white or colored particle therein. Since the white or colored particle is contained in the polymer component, the surface of an electrophoretic particle is a polymer component layer having a basic group originating from an amino group of the monomer component represented by the general formula (I) and a steric effect caused by polysiloxane of the monomer component represented by the general formula (II) (hindrance on attracting force between particles) so that a particle with an excellent charged property and dispersion stability in a dispersion medium is provided.

As a method for obtaining an electrophoretic particle according to this embodiment, there may be provided, for example, a method utilizing a so-called coacervation which includes dissolving a polymer component provided by preliminarily copolymerizing the monomer component represented by the general formula (I) and the monomer component represented by the general formula (II) in a well-dissolvable solvent, dispersing white or colored particles in the solution, and adding a poor solvent for the polymer component so that the polymer component is adsorbed on the surface of the white or colored particle, and a method that includes adding the monomers on the condition that white or colored particles are dispersed in a non-polar solvent and forming a polymer layer on the surface of the white or colored particle simultaneously with the polymerization, as disclosed in Japanese Patent Application Publication No. 2005-265938, but it is not limited to these methods. Additionally, for a white or colored particle to be used, the particles provided for the second embodiment described above may be used.

Fourth Embodiment

In an electrophoretic particle dispersion liquid according to the fourth embodiment of the preset invention, an electrophretic particle in which at least a polymer component for the first embodiment described above is grafted on the surface of a white or colored particle through a chemical bond is dispersed in a non-polar solvent. In the case of use in an electrophoretic display, the dispersion medium may preferably be a non-polar organic solvent with a high electrical insulation property. For such a non-polar organic solvent, there may be provided, for example, paraffinic hydrocarbons such as pentane, hexane, heptane, octane, nonane, decane and dodecane; isoparaffinic hydrocarbons such as isohexane, isooctane, and isododecane; alkylnaphthenic hydrocarbons such as liquid paraffins; aromatic hydrocarbons such as benzene, toluene, xylene, alkylbenzenes, and solvent naphtha; and silicone oils such as dimethyl silicone oil, methyl phenyl silicone oil, dialkyl silicone oils, alkyl phenyl silicone oils, cyclic poly(dialkylsiloxane)s, and cyclic poly(alkylphenylsiloxane)s. To the non-polar solvent, a dispersing agent or the like may be further added according to need, in order to control the dispersion of dispersed particles. The mass ratio of electrophoretic particles in the electrophoretic particle dispersion liquid is appropriately determined to obtain a desired color density and about 1 to about 50% by mass is appropriate.

Each of these components is added, mixed and dispersed into a non-polar solvent so as to obtain a particle dispersion liquid. In this case, for a dispersing device, publicly known dispersing devices such as a homogenizer, a ball mill, a sand mill, and atliter may be used.

Fifth Embodiment

In an electrophoretic particle dispersion liquid according to the fifth embodiment of the present invention, electrophoretic particles in which at least a polymer component according to the first embodiment of the present invention contains a white or colored particle are dispersed in a non-polar solvent.

For the non-polar solvent, the non-polar solvents for the fourth embodiment described above are provided. To the non-polar solvent, a dispersing agent or the like may be further added according to need, in order to control the dispersion of dispersed particles. The mass ratio of a solid content in the particle dispersion liquid is appropriately determined to obtain a desired color density and about 1 to about 50% by mass is appropriate. Each of these components is added, mixed and dispersed into a non-polar solvent so as to obtain a particle dispersion liquid. In this case, for a dispersing device, publicly known dispersing devices such as a homogenizer, a ball mill, a sand mill and atliter may be used.

Sixth Embodiment

An electrophoretic particle dispersion liquid according to the sixth embodiment of the present invention is an electrophoretic particle dispersion liquid characterized in that a polymer component for the fourth or fifth embodiment described above is insoluble in a non-polar solvent. Since a polymer component for an electrophoretic particle in the electrophoretic particle dispersion liquid is insoluble in a solvent, the surface of the electrophoretic particle is a polymer component layer with a high electrical insulation property and has a good charged property. A polymer used for the present embodiment may preferably be a copolymer obtained from a combination of the monomers represented by the general formulas (I) and (II) and further another monomer. For another monomer to be combined, there may be provided, for example, monomers having a vinyl group(s) such as 2-ethylhexyl (meth)acrylate, octyl (meth)acrylate, nonyl (meth)acrylate, decyl (meth)acrylate, lauryl (meth)acrylate, stearyl (meth)acrylate, vinyl laurate, methyl (meth)acrylate, ethyl (meth)acrylate, butyl (meth)acrylate, hexyl (meth)acrylate, cyclohexyl (meth)acrylate, benzyl (meth)acrylate, phenyl (meth)acrylate, styrene, vinyltoulene, vinyl acetate, divinylbenzene, ethylene glycol di(meth)acrylate, diethylene glycol di(meth)acrylate, triethylne glycol tri(meth)acrylate, butanediol di(meth)acrylare, 1,6-hexanediol di(meth)acrylate, trimethylolpropane tri(meth)acrylate, tetramethylolmethane tri(meth)acrylate, tetramethylolmethane tetra(meth)acrylate, dipropylene glycol di(meth)acrylate, trimethylolhexane tri(meth)acrylate, pentaerythritol tetra(meth)acrylate, 1,3-dibutylene glycol di(meth)acrylate, and trimethylolethane tri(meth)acrylate, and one kind or two or more kinds of these monomers may be used. The kind(s) of such (an)other monomer(s) to be combined and the compounding ratio thereof for the polymerization may preferably be determined to provide a copolymer insoluble in a non-polar solvent.

Seventh Embodiment

An electrophoretic particle dispersion liquid according to the seventh embodiment of the present invention further contains an acid soluble in a non-polar solvent used in the electrophoretic particle dispersion liquid. The acid soluble in a non-polar solvent is adsorbed on the surface of an electrophoretic particle in the electrophoretic particle dispersion liquid according to the embodiment described above by means of its interaction with an amino group being a basic group thereon, and the electrophoretic particle is further positively charged by means of ion production due to the acid-base dissociation.

Substances containing an acid soluble in a non-polar solvent which are used in the present embodiment are not particularly limited and copolymers obtained from a monomer having an acid group and another monomer are preferable. Such another polymer is preferably soluble in a non-polar solvent in which a homopolymer thereof is used. For examples of a monomer having an acid group, there may be provided (meth)acrylic acid, maleic acid, maleic anhydride, itaconic acid, itaconic anhydride, fumaric acid, cinnamic acid, crotonic acid, vinylbenzoic acid, 2-methacryloxyethyl succinate, 2-methacryloxyethyl maleate, 2-methacryloxyethyl hexahydrophthalate, 2-methacryloxyethyl trimellitate, vinylsulfonic acid, allylsulfonic acid, styrenesulfonic acid, 2-sulfoethyl methacrylate, 2-acrylamide-2-methylpropanesulfonic acid, 3-chloroamidephosphoxypropyl methacrylate, 2-methacryloxyethyl acid phosphate, hydroxystyrene, and the like. The monomer whose homopolymer is soluble in a non-polar solvent also depends on a non-polar solvent to be used, and however, a homopolymer of the monomer represented by the general formula (II) described above is soluble in many non-polar solvents such as aliphatic hydrocarbons, aromatic hydrocarbons, and silicone oils.

Eighth Embodiment

The eighth embodiment of the present invention is described with reference to a schematic diagram (1) of an image display medium as shown in FIG. 1. In FIG. 1, "1" and "2" refer to electrodes composed of an electrically conductive layer and at least one thereof is optically transparent. For the electrodes, there may be used thin films formed from metals such as Al, Ag, Ni, and Cu, or transparent electric conductors such as ITO, $SnO_2$, and ZnO:Al by means of a sputtering method, a vacuum deposition method, a CVD method, a coating method or the like, coatings of a mixture of an electrically conductive agent and a solvent or synthetic resin binder, and the like. For the electrically conductive agent, there may be used, for example, cationic polymer electrolytes such as polymethylbenzyl trimethyl ammonium chloride and polyallyl polymethyl ammonium chloride, anionic polymer electrolytes such as polystyrenesulfonates (salts) and polyacrylates (salts), and electrically conductive fine particles of zinc oxide, tin oxide, indium oxide or the like. The electrically conductive layer may be so thick that it has a self-supporting function itself or the electrically conductive layer may be provided on a substrate having a self-supporting function which is not shown in the figure, and both cases may be used preferably. Also, the electrically conductive layers 1 and 2 may be layers exhibiting an anisotropic electrical conductivity or may be layers having segments patterned such that an electrically conductive part penetrates in the directions of thickness or multi-dot-type segments, and in either case, since electric field is allowed to be applied between the electrically conductive layers 1 and 2 by bring electrodes of a power supply into contact with parts of the electrically conductive layers 1 and 2, white or colored particles may be moved certainly. In order to conduct a display, a device for applying a voltage between the electrically conductive layers 1 and 2 may be merely provided.

In FIG. 1, "3" refers to a microcapsule containing an electrophoretic particle dispersion liquid. The microcapsule is not an essential feature in the embodiment of the present invention, and alternatively, a particle dispersion liquid as described below may be enclosed in a cell provided with a fine partition wall by means of photolithography or the like. Anyway, it is preferable to partitioning space between the two electrodes with a number of fine cells since deviation of particles due to the gravity or aggregation of particles may be prevented. A method of manufacturing a microcapsule is not particularly limited and publicly known methods such as a coacervation method and a phase separation method may be used.

In the present embodiment, "4" refers to a white electrophoretic particle. For the white electrophoretic particle 4, a white particle among the electrophoretic particles as described above for the embodiment of the present invention may be used.

In the present embodiment, "5" refers to a dispersion medium that is a non-polar solvent having a black color, a blue-color or the like, and a non-polar organic solvent may have a color different from the color of the white particle. According to need, a dispersing agent or the like may be added into the colored dispersion medium in order to control the dispersion of dispersed particles. For examples of dyes used for coloring the dispersion medium, oil-soluble dyes which are soluble in the dispersion medium may be provided and dyes classified into the Solvent dyes in the Colour Index may be used preferably. These dyes include azoic, anthraquinone-type, phthalocyanine-type, and triarylmethane-type dyes of each color. For the representative oil dyes, there may be provided, for example, spirit blacks (SB, SSBB, AB), nigrosin-bases (SA, SAP, SAPL, EE, EEL, EX, EXBP, EB), oil yellows (105, 107, 129, 3G, GGS), oil oranges (201, PS, PR), fast orange, oil reds (5B, RR, OG), oil scarlet, oil pink 312, oil violet # 730, macrolex blue RR, sumiplast green G, oil browns (GR, 416), sudan black X60, oil greens (502, BG), oil blues (613, 2N, BOS), oil blacks (HBB, 860, BS), varifast yellows (1101, 1105, 3108, 4120), varifast oranges (3209, 3210), varifast reds (1306, 1355, 2303, 3304, 3306, 3320), varifast pink 2310N, varifast browns (2402, 3405), varifast blues (3405, 1501, 1603, 1605, 1607, 2606, 2610), varifast violets (1701, 1702), and varifast blacks (1802, 1807, 3804, 3810, 3820, 3830), but they may be oil dyes or oil-soluble dyes other than the dyes described herein unless they are contrary to the object of the present invention.

The weight ratio of a solid content in the electrophoretic particle dispersion liquid in the microcapsule is appropriately determined so as to obtain the desired color density and about 0.1 to about 25% by mass is preferable. As previously described for a method of manufacturing an electrophoretic particle dispersion liquid, the electrophoretic particle dispersion liquid may be obtained by adding, mixing and dispersing white electrophoretic particles in a colored non-polar solvent. In this case, for a dispersion device, publicly known dispersion devices such as a homogenizer, a ball mill, a sand mill, and atliter may be used. The microcapsule may be manufactured by using the electrophoretic particle dispersion liquid by means of a coacervation method, a phase separation method or the like.

In the present embodiment, "6" refers to an adhesive support layer which holds the microcapsules between the electrically conductive layers 1 and 2. For the adhesive support layer 6, arbitrarily publicly known materials that are allowed to adhere to the electrically conductive layer may be used and it is preferable to be transparent and to be excellent in the electrical insulating property thereof. Particularly, it is preferable to be a solventless-type curable material. For such a material, there may be provided a photo-curable-type epoxy resins, urethane resins, and acryl resins.

In order to manufacture an image display medium according to the present embodiment, a mixture provided by mixing the particle dispersion liquid-containing microcapsules 3 as obtained above and an adhesive that is allowed to provide the adhesive support layer 6 is applied on the electrode 1 or 2 and the opposing electrode 2 or 1 is applied. For an application method, publicly known film-coating methods such as a blade, a wire bar, dipping and spin-coat may be used and it is not particularly limited. An image display medium may be manufactured more readily by these processes.

Ninth Embodiment

Figure 2:
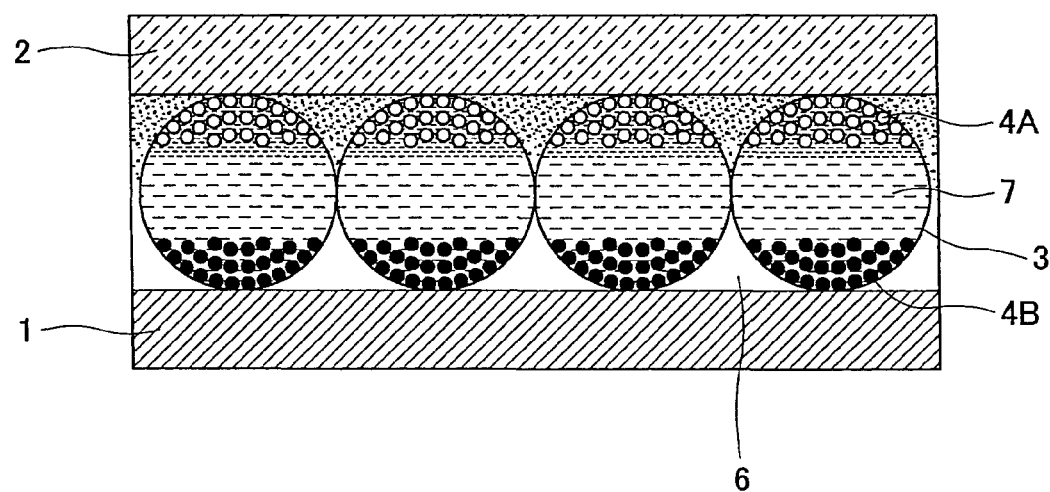
FIG. 2 is a cross-sectional schematic diagram (2) of an image display medium.

The ninth embodiment of the present invention is described with reference with FIG. 2. In FIG. 2, it is the same as the image display medium according to the eighth embodiment except the content of a microcapsule 3. In FIG. 2, "4A" and "4B" in the microcapsule 3 refer to white or colored electrophoretic particles and the colors and charging polarities of "4A" and "4B" are different from each other. In FIG. 2, "7" refers to a dispersion medium, and it is preferable to be colorless and transparent, since image contrast based on the color difference between the white or colored electrophoretic particles 4A and 4B is not adversely affected. According to need, a dispersing agent or the like may be added into the dispersion medium 7 in order to control the dispersion of electrophoretic particles. For examples of white electrophoretic particles constituting a particle dispersion liquid, the white electrophoretic particles according to the eighth embodiment may be provided. For examples of colored electrophoretic particles, the electrophoretic particles using a colored particle according to the embodiment of the present invention may be provided which are described in the embodiments 1, 2 and 3. In FIG. 2, "1" and "2" are electrically conductive layers, at least one of which is optically transparent. For the electrically conductive layers, the above-mentioned materials may be used. When the electrodes of a power supply are provided in contact with parts of the electrically conductive layers 1 and 2, electric field is allowed to be applied between the electrically conductive layers 1 and 2, so that the two kinds of particles 4A and 4B are allowed to move certainly and oppositely to each other. In order to conduct a display, a device for applying a voltage between the electrically conductive layers 1 and 2 may be merely provided, which is convenient.

An image display medium according to the embodiment may also be manufactured, generally, similarly to the image display medium according to the seventh embodiment except that colored electrophoretic particles are added.

Tenth Embodiment

Figure 3:
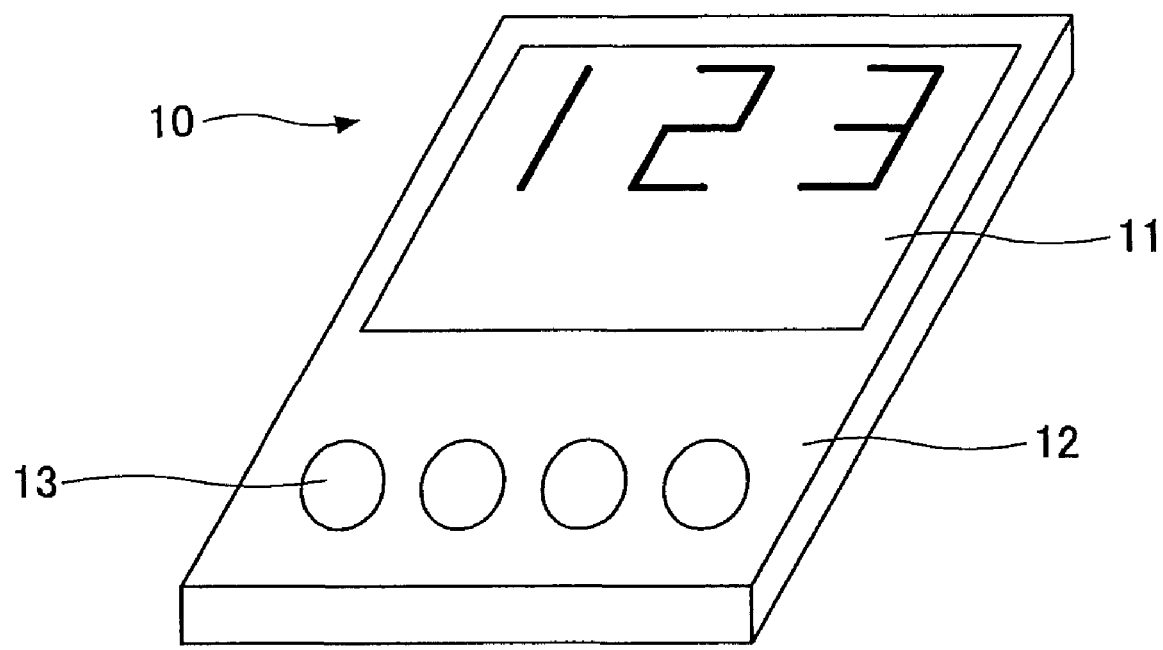
FIG. 3 is a schematic diagram of an image display device.

An image display device according to the tenth embodiment of the present invention is described with reference to FIG. 3. As shown in FIG. 3, an image display device 10 according to the present embodiment if the present invention includes an image display medium 11, and further includes an information input device 13 and a driving circuit, an operation circuit, an internal memory, a power supply device, and the like which are not shown in the figure. Electrodes of the display medium form a dot matrix and specified dot(s) are turned on so as to display an image as a whole. In FIG. 3, "12" refers to a housing. Also, the power supply device may be provided with an internal electric power source such as a battery or an electric power receiving device for receiving electric power from an external electric power source, such as a socket.

PRACTICAL EXAMPLES

Practical examples of the present invention are further described in detail. However, the present invention is not limited to the practical examples described below. Additionally, in the descriptions of the practical examples and comparative examples, "part(s)", "%", and the like are provided in the mass standard unless otherwise stated.

Practical Example 1

(Manufacturing of White Electrophoretic Particles)

In a reaction vessel with an agitator, a mixed solvent of 93 parts of ethanol and 7 parts of water was prepared whose pH was adjusted to 4.5 by glacial acetic acid. After 16 parts of 3-(trimethoxysilyl) propyl methacrylate was dissolved, 100 parts of titanium oxide was added and agitation was continued for 10 minutes. Then, after 180 part of ethanol was added and agitation was conducted, a solid content recovered by means of centrifugation was left for one day and one night and subsequently was vacuum-dried at 70° C. for 4 hours so as to obtain a surface-treated titanium oxide. In another reaction vessel with an agitator, a thermometer and a reflux condenser, 130 parts of toluene was prepared and 99 parts of a methacryloxypropyl-modified silicone (produced by Chisso Corporation, Silaplane FM-0711; a compound of general formula (II) wherein x=3, whose molecular weight is about 1,000) and 1 part of allylamine were dissolved. 50 parts of toluene and 75 parts of the surface-treated titanium oxide and 0.5 parts of azobisisobutyronitrile which were dissolved therein was added therein and heating and agitation were conducted under nitrogen atmosphere at 70° C. for 6 hours. After the reaction was completed, a solid content was washed with toluene while centrifugation thereof wad repeated and finally vacuum-dried at 70° C. for 4 hours so as to obtain desired white electrophoretic particles.

(Manufacturing and Operation of an Image Display Medium)

10 parts of urea, 1 part of resorcinol and 10 parts of an ethylene-maleic anhydride copolymer were dissolved in 290 parts of water and the pH was adjusted to 3.5 with an aqueous solution of sodium hydroxide. Furthermore, a particle dispersion liquid was prepared by adding 3 parts of the white electrophoretic particles described above into 30 parts of a saturated solution of a dye (produced by Bayer AG, macrolex blue RR) in an isoparaffinic hydrocarbon solvent (produced by Exxon Chemical Company, Isopar G) and by conducting ultrasonic dispersion. The dispersion liquid was added and 25 parts of a formaldehyde solution was further added into the aqueous solution, and heating and agitation at 50° C. for 3 hours were conducted. After the reaction was completed, microcapsules were obtained through suction filtration, rinsing and drying.

The obtained microcapsules were dispersed in a urethane resin for heat seal and they were applied on a glass substrate with an ITO electrode by a wire bar. Then, the applied film was sandwiched by one more ITO electrode which was laminated thereon.

When −5V with reference to the lower ITO electrode were applied on the upper ITO electrode, the white electrophoretic particles quickly move to the side of upper electrode and white color was observed as viewed from the surface of an upper substrate. Then, when +5V were applied on the upper electrode, the white electrophoretic particles quickly move to the side of lower electrode and a color resulting from the color of a dye in an electrophoretic medium was clearly observed as viewed from the side of the upper substrate. The light reflectance for a white color display (the proportion of the amount of reflected light to the amount of incident white light) was 45%. Also, when application of the voltage was stopped on the condition of the white color and leaving of them was conducted for one day, a little change was merely found in the light reflectance.

Practical Example 2

(Manufacturing of White Electrophoretic Particles)

In a reaction vessel with an agitator, a thermometer and a reflux condenser, 130 parts of toluene was prepared and 100 parts of lauryl methacrylate was dissolved therein. 50 parts of toluene and 75 parts of the surface-treated titanium oxide obtained in practical example 1 and 0.5 parts of azobisisobutyronitrile which were dissolved therein were added therein and heating and agitating were conducted under nitrogen atmosphere at 70° C. for 6 hours. After the reaction was completed, a sold content was washed with toluene while centrifugation thereof was repeated, and finally, vacuum-drying at 70° C. for 4 hours was conducted so as to obtain desired white electrophoretic particles.

(Manufacturing of Black Electrophoretic Particles)

In a reaction vessel with an agitator, a thermometer and a reflux condenser, 3,000 parts of water was prepared and 100 parts of carbon black and 3 parts of 37% hydrochloric acid were added. After 25 parts of 4-vinylaniline was added into it, heating and agitation at 65° C. were conducted and 12 parts of 10% aqueous solution of sodium nitrite was dropped into it. Furthermore, heating and agitation were continued for 3 hours so as to complete the reaction, then, a solid content was washed with water while centrifugation thereof was repeated, and finally, vacuum-drying at 40° C. for 4 hours was conducted so as to obtain a surface-treated carbon black. After the agitation, in another reaction vessel with an agitator, a thermometer and a reflux condenser, 100 parts of toluene was prepared and 99 parts of a methacryloxypropyl-modified silicone (produced by Chisso Corporation, Silaplane FM-0711; a compound of general formula (II) wherein x=3, whose molecular weight is about 1,000) and 1 part of methallylamine were dissolved therein. 50 parts of the surface-treated carbon black described above and 0.5 parts of azobisisobutyronitrile were added therein and heating and agitation were conducted under nitrogen atmosphere at 70° C. for 6 hours. After the reaction was completed, cooling, addition of 500 parts of tetrahydrofuran, and agitation were conducted and they were thrown into 3,000 parts of methanol so as to precipitate a solid content. The solid content recovered by filtration was washed with tetrahydrofuran, and finally, vacuum-drying at 70° C. for 4 hours was conducted so as to obtain desired black electrophoretic particles.

(Manufacturing and Operation of an Image Display Medium)

10 parts of urea, 1 part of resorcinol, and 10 parts of an ethylene-maleic anhydride copolymer were dissolved in 290 parts of water and the pH was adjusted to 3.5 with an aqueous solution of sodium hydroxide. Furthermore, after a particle dispersion liquid was prepared by adding 15 parts of the white electrophoretic particles described above, 0.7 parts of the black electrophoretic particles described above, and 0.1 part of an oil-soluble surfactant (produced by Lubrizol Corporation, Solsperse 17000) into 20 parts of an isoparaffinic hydrocarbon solvent (produced by Exxon Chemical Company, Isopar G) and by conducting ultrasonic dispersion, and the dispersion liquid was added into the aqueous solution, 25 parts of an formaldehyde solution was further added and heating and agitation at 50° C. for 3 hours were conducted. After the reaction was completed, microcapsules were recovered through suction filtration, rinsing and drying.

The obtained microcapsules described above were dispersed in a urethane resin for heat seal and they were applied on a glass substrate with an ITO electrode by a wire bar. Then, the applied film was sandwiched by one more ITO electrode which was laminated thereon so as to manufacture an image display medium.

When −5V with reference to the lower ITO electrode were applied on the upper ITO electrode, the black electrophoretic particles quickly move to the side of upper electrode while the white electrophoretic particles quickly move to the side of lower electrode and black color was observed as viewed from the surface of an upper substrate. Then, when +5V were applied on the upper electrode, the white electrophoretic particles quickly move to the side of upper electrode while the black electrophoretic particles quickly move to the side of lower electrode and white color was observed as viewed from the side of upper electrode. The light reflectance for a white color display (the proportion of the amount of reflected light to the amount of incident white light) was 45%. Also, when application of the voltage was stopped on the condition of the white color and leaving of them was conducted for one day, a little change was merely found in the light reflectance.

Practical Example 3

Black electrophoretic particles in the present practical example were manufactured based on a method for manufacturing composite particles as disclosed in Japanese Patent Application Publication No. 2005-265938.

(Manufacturing of a Dispersing Agent for Manufacturing Black Electrophoretic Particles)

A solution was contained which was provided by dissolving 14 parts of a methacryloxypropyl-modified silicone (produced by Chisso Corporation, Silaplane FM-0711), 6 parts of dimethylaminoethyl methacrylate (produced by Tokyo Chemical Industry Co., Ltd.), and 0.1 part of azobisdimethylvaleronitrile which was a polymerization initiator in 180 parts of a silicone oil (produced by Shin-Etsu Chemical Co., Ltd., KF-96L 1cs) and heating was conducted under nitrogen atmosphere at 60° C. for 6 hours. After the reaction was completed, the silicone oil was evaporated and removed so as to obtain a homogeneous and transparent resin.

(Manufacturing of Black Electrophoretic Particles)

In a reaction vessel with an agitator, a thermometer and a reflux condenser, 1 part of the dispersing agent described above, 1.5 parts of carbon black and 200 parts of a silicone oil were combined and cooled while ultrasonic waves were applied by a homogenizer for 1 hour, so that the carbon black was dispersed. 6 parts of methyl methacrylate, 3 parts of a methacryloxypropyl-modified silicone (produced by Chisso Corporation, Silaplane FM-0725; a compound of general formula (II) wherein x=3, whose molecular weight is about 10,000), 0.1 part of allylamine, and 0.05 parts of azobisdimethylvaleronitrile which was a polymerization initiator were added into it and a reaction was conducted at 60° C. for 6 hours. After the reaction was completed, only a solid component was recovered and dried, so as to manufacture desired black electrophoretic particles.

(Manufacturing and Operation of an Image Display Medium)

An image display medium was manufactured similarly to practical example 2 except that the black electrophoretic particles in practical example 2 were replaced with the black electrophoretic particles in practical example 3.

When −5V with reference to the lower ITO electrode were applied on the upper ITO electrode, the black electrophoretic particles quickly move to the side of upper electrode while the white electrophoretic particles quickly move to the side of lower electrode and black color was observed as viewed from the surface of an upper substrate. Then, when +5V were applied on the upper electrode, the white electrophoretic particles quickly move to the side of upper electrode while the black electrophoretic particles quickly move to the side of lower electrode and white color was observed as viewed from the side of upper electrode. The light reflectance for a white color display (the proportion of the amount of reflected light to the amount of incident white light) was 45%. Also, when application of the voltage was stopped on the condition of the white color and leaving of them was conducted for one day, a little change was merely found in the light reflectance.

Practical Example 4

(Manufacturing of an Acid Soluble in a Non-Polar Solvent)

A solution was contained which was provided by dissolving 18 parts of a methacryloxypropyl-modified silicone (produced by Chisso Corporation, Silaplane FM-0711), 2 parts of methacrylic acid (produced by Tokyo Chemical Industry Co., Ltd.), and 0.1 part of azobisdimethylvaleronitrile which was a polymerization initiator in 180 parts of a silicone oil (produced by Shin-Etsu Chemical Co., Ltd., KF-96L 1cs) and heating was conducted under nitrogen atmosphere at 60° C. for 6 hours. After the reaction was completed, the silicone oil was evaporated and removed so as to obtain a homogeneous and transparent resin.

(Manufacturing and Operation of an Image Display Medium)

An image display medium was manufactured similarly to practical example 3 except that 0.1 part of the acid described above was added into an isoparaffinic hydrocarbon solvent which was a dispersion medium in practical example 3.

When −5V with reference to the lower ITO electrode were applied on the upper ITO electrode, the black electrophoretic particles quickly move to the side of upper electrode while the white electrophoretic particles quickly move to the side of lower electrode and black color was observed as viewed from the surface of an upper substrate. Then, when +5V were applied on the upper electrode, the white electrophoretic particles quickly move to the side of upper electrode while the black electrophoretic particles quickly move to the side of lower electrode and white color was observed as viewed from the side of upper electrode. The light reflectance for a white color display (the proportion of the amount of reflected light to the amount of incident white light) was 45%. Also, when application of the voltage was stopped on the condition of the white color and leaving of them was conducted for one day, a little change was merely found in the light reflectance.

Comparative Example 1

(Manufacturing and Operation of an Image Display Medium)

An image display medium was manufactured similarly to practical example 1 except that allylamine was replaced with dimethylaminoethyl methacrylate for the white electrophoretic particles in practical example 1 and a voltage application test similar to that of practical example 1 was conducted. At an applied voltage of 5 V, the obtained light reflectance for a white color display was only 30% and an applied voltage equal to or greater than 10 V was required to obtain a light reflectance comparable to that for a white color display in practical example 1.

Comparative Example 2

An image display medium was manufactured similarly to practical example 2 except that meta-allylamine was replaced with diethylaminoethyl methacrylate for the black electrophoretic particles in practical example 2 and a voltage application test similar to that of practical example 1 was conducted. At an applied voltage of 5 V, the obtained light reflectance for a white color display was only 25% and an applied voltage equal to or greater than 10 V was required to obtain a light reflectance comparable to that for a white color display in practical example 2.

Comparative Example 3

An image display medium was manufactured similarly to practical example 3 except that allylamine was replaced with diethylaminoethyl methacrylate for the black electrophoretic particles in practical example 3 and a voltage application test similar to that of practical example 1 was conducted. At an applied voltage of 5 V, the obtained light reflectance for a white color display was only 30% and an applied voltage equal to or greater than 10 V was required to obtain a light reflectance comparable to that for a white color display in practical example 3.

APPENDIX

Typical embodiments (1) to (9) of the present invention are described below.

Embodiment (1) is an electrophoretic particle characterized by comprising a polymer component on a surface thereof which polymer component is a copolymer obtained from materials comprising at least a monomer component represented by a following general formula (I):

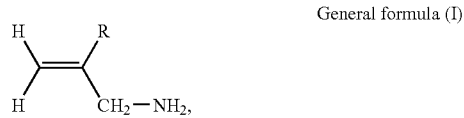

General formula (I)

[in which formula, R represents a hydrogen atom or a methyl group.] and a monomer component represented by a following general formula (II):

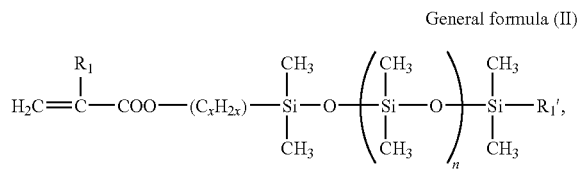

General formula (II)

[in which formula, $R_1$ represents a hydrogen atom or a methyl group, $R_1'$ represents a hydrogen atom or an alkyl group whose carbon number is 1-4, n represents a natural number, and x represents an integer of 1-3.].

According to embodiment (1) above, an electrophoretic particle which may exhibit a charged property and dispersion stability thereof in a better balance may be provided since a particle surface of an electrophoretic particle comprises a polymer obtained from materials comprising at least monomer components of general formula (I) and general formula (II).

Embodiment (2) is the electrophoretic particle as described in embodiment (1) above, characterized in that an average molecular weight of a monomer represented by general formula (II) is 500-50,000.

According to embodiment (2) above, an electrophoretic particle which may exhibit a charged property and dispersion stability thereof in a particularly better balance may be provided, since an average molecular weight of a monomer represented by general formula (II) is in a range described above.

Embodiment (3) is the electrophoretic particle as described in embodiment (1) or (2) above, characterized in that the polymer component is grafted on a surface of a white or colored particle through a chemical bond.

According to embodiment (3) above, an electrophoretic particle whose charged property and dispersion stability may be both superior may be obtained, since a polymer component is grafted on a surface of a white or colored particle through a chemical bond so that a polymer component layer may be formed on a white or colored particle surface certainly and robustly.

Embodiment (4) is the electrophoretic particle as described in embodiment (1) or (2) above, characterized in that the polymer component contains a white or colored particle therein.

According to embodiment (4) above, an electrophoretic particle whose charged property and dispersion stability may be both superior may be obtained, since a polymer component contains a white or colored particle therein so that a particle surface may be completely covered with a polymer component.

Embodiment (5) is an electrophoretic particle dispersion liquid characterized in that the electrophoretic particle as described in any of embodiments (1) to (4) above is dispersed in a non-polar solvent.

According to embodiment (5) above, an electrophoretic particle dispersion liquid whose charged property and dispersion stability may be both better may be obtained, since a particle comprising an electrophoretic particle is dispersed in a non-polar solvent.

Embodiment (6) is the electrophoretic particle dispersion liquid as described in embodiment (5) above, characterized in that the polymer component is insoluble in a non-polar solvent.

According to embodiment (6) above, an electrophoretic particle in which an insulating property thereof may be higher and a charged property thereof may be superior may be obtained, since a polymer component is not dissolved in a non-polar solvent so that a coating film of a polymer component on a white or colored particle surface may be retained for a long period of time.

Embodiment (7) is the electrophoretic particle dispersion liquid as described in embodiment (5) or (6) above, characterized by comprising an acid soluble in the non-polar solvent.

According to embodiment (7) above, a particle may exhibit a strong and positive charged property and an electrophoretic property of a particle may be improved, since an electrophoretic particle dispersion liquid further comprises an acid soluble in a non-polar solvent so that ionization of an amino group may be promoted by an acid-base dissociation between it and an amino group on a particle surface.

Embodiment (8) is an image display medium which comprises the electrophoretic particle dispersion liquid as described in any of embodiments (5) to (7) above between a pair of electrically conductive layers at least one of which is optically transparent.

According to embodiment (8) above, an image display medium which may be superior in terms of a response thereof at a lower voltage and a display stability thereof for a long period of time may be provided, since it comprises the electrophoretic particle dispersion liquid as described above.

Embodiment (9) is an image display device characterized by comprising the image display medium as described in embodiment (8) above, an information input device configured to provide image information to the image display medium, and an electric power supplying device configured to supply an electric power to the image display medium and the information input device.

According to embodiment (9) above, an image display device which may be superior in terms of a response thereof at a lower voltage and a display stability thereof for a long period of time may be provided, since it comprises the electrophoretic particle dispersion liquid as described above.

Although the embodiment(s) and practical example(s) of the present invention have been specifically described above, the present invention is not limited to the embodiment(s) or practical example(s), and the embodiment(s) and specific example(s) of the present invention may be altered or modified without departing from the spirit or scope of the present invention.

The present application claims the benefit of foreign priority based on Japanese Patent Application No. 2007-133331 filed on May 18, 2007 in Japan, the entire contents of which is hereby incorporated by reference.

INDUSTRIAL APPLICABILITY

The present invention may be applied to an electrophoretic particle and an image display device utilizing the same, in particular, an electrophoretic particle, an electrophoretic particle dispersion liquid, and an image display medium and image display device utilizing the same.

The invention claimed is:

1. An image display medium comprising an electrophoretic particle comprising a polymer component on a surface thereof which polymer component is a copolymer obtained from materials comprising at least a monomer component represented by a following general formula (I): H—H=R—CH2-NH2 wherein R represent a hydrogen atom or methyl group, and a monomer component represent by following formula (II); $H_2C=R_1-C-COO-(CXH_{2x})-SI-CH_3-CH_3-O-(CH_3SI-CH_3-O)-CH_3-SI-CH_3-R_1'!$
wherein RI represents a hydrogen atom or a methyl group, RI' represents a hydrogen atom or an alkyl group whose carbon number is 1 to 4, n represents a natural number, and x represents an integer of 1 to 3.

2. The electrophoretic particle as claimed in claim 1, wherein an average molecular weight of a monomer represented by general formula (II) is 500 to 50,000.

3. The electrophoretic particle as claimed in claim 1, wherein the polymer component is grafted on a surface of a white or colored particle through a chemical bond.

4. The electrophoretic particle as claimed in claim 1, wherein the polymer component contains a white or colored particle therein.

5. An image display medium comprising an electrophoretic particle dispersion liquid, comprising an electrophoretic particle dispersed in a non-polar solvent, the electrophoretic particle comprising a polymer component on a surface thereof which polymer component is a copolymer obtained from materials comprising at least a monomer component represented by a following general formula (I): H—H=R—CH2-NH2 wherein R represent a hydrogen atom or methyl group, and a monomer component represent by following formula (II): $H_2C=R_1-C-COO-(CXH_{2x})-SI-CH_3-CH_3-O-(CH_3SI-CH_3-O)-CH_3-SI-CH_3-R_1'!$
wherein RI represents a hydrogen atom or a methyl group, RI' represents a hydrogen atom or an alkyl group whose carbon number is 1 to 4, n represents a natural number, and x represents an integer of 1 to 3.

6. The electrophoretic particle dispersion liquid as claimed in claim 5, wherein the polymer component is insoluble in a non-polar solvent.

7. The electrophoretic particle dispersion liquid as claimed in claim 5, which comprises an acid soluble in the non-polar solvent.

8. An image display medium comprising an electrophoretic particle dispersion liquid between a pair of electrically conductive layers at least one of which is optically transparent, the electrophoretic particle dispersion liquid comprising an electrophoretic particle dispersed in a non-polar solvent, and
the electrophoretic particle comprising a polymer component on a surface thereof which polymer component is a copolymer obtained from materials comprising at least a monomer component represented by a following general formula (I):

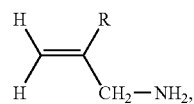

General formula (I)

wherein R represents a hydrogen atom or a methyl group, and a monomer component represented by a following general formula (II):

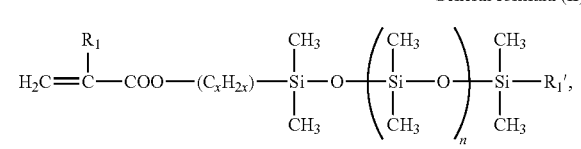

General formula (II)

wherein $R_1$ represents a hydrogen atom or a methyl group, $R_1'$ represents a hydrogen atom or an alkyl group whose carbon number is 1 to 4, n represents a natural number, and x represents an integer of 1 to 3.

9. An image display device comprising the image display medium as claimed in claim 8, an information input device configured to provide image information to the image display medium, and an electric power supplying device configured to supply an electric power to the image display medium and the information input device.

10. The image display medium as claimed in claim 9, wherein the electrophoretic particle dispersion liquid is encapsulated in at least one of a microcapsule and a cell, between the pair of electrically conductive layers.

11. The image display medium as claimed in claim 10, further comprising an adhesive support layer on one of the pair of electrically conductive layers.

* * * * *